United States Patent [19]

Kabasin et al.

[11] Patent Number: 4,502,453
[45] Date of Patent: Mar. 5, 1985

[54] DUAL FUEL SUPPLY SYSTEM

[75] Inventors: Daniel F. Kabasin, Rochester; Donald Stoltman, Henrietta, both of N.Y.

[73] Assignee: General Motors Corporation, Detroit, Mich.

[21] Appl. No.: 596,315

[22] Filed: Apr. 3, 1984

[51] Int. Cl.³ .............................................. F02B 75/12
[52] U.S. Cl. ..................... 123/575; 123/1 A
[58] Field of Search ............... 123/1 A, 575, 578, 576, 123/52

[56] References Cited

U.S. PATENT DOCUMENTS

| | | | |
|---|---|---|---|
| 2,366,830 | 1/1945 | Cannon et al. | 123/575 |
| 2,865,355 | 12/1958 | Hilton | 123/575 |
| 3,500,802 | 3/1970 | Long | 123/475 |
| 4,402,296 | 9/1983 | Schwarz | 123/1 A |

FOREIGN PATENT DOCUMENTS

| | | | |
|---|---|---|---|
| 727030 | 6/1932 | France | 123/575 |
| 48771 | 3/1983 | Japan | 123/575 |

Primary Examiner—E. Rollins Cross
Attorney, Agent, or Firm—C. K. Veenstra

[57] ABSTRACT

A fuel supply passage has connections to two sources of fuel, and valves responsive to pressurization of the connections inhibit circulation of fuel from one of the sources to the other source.

5 Claims, 1 Drawing Figure

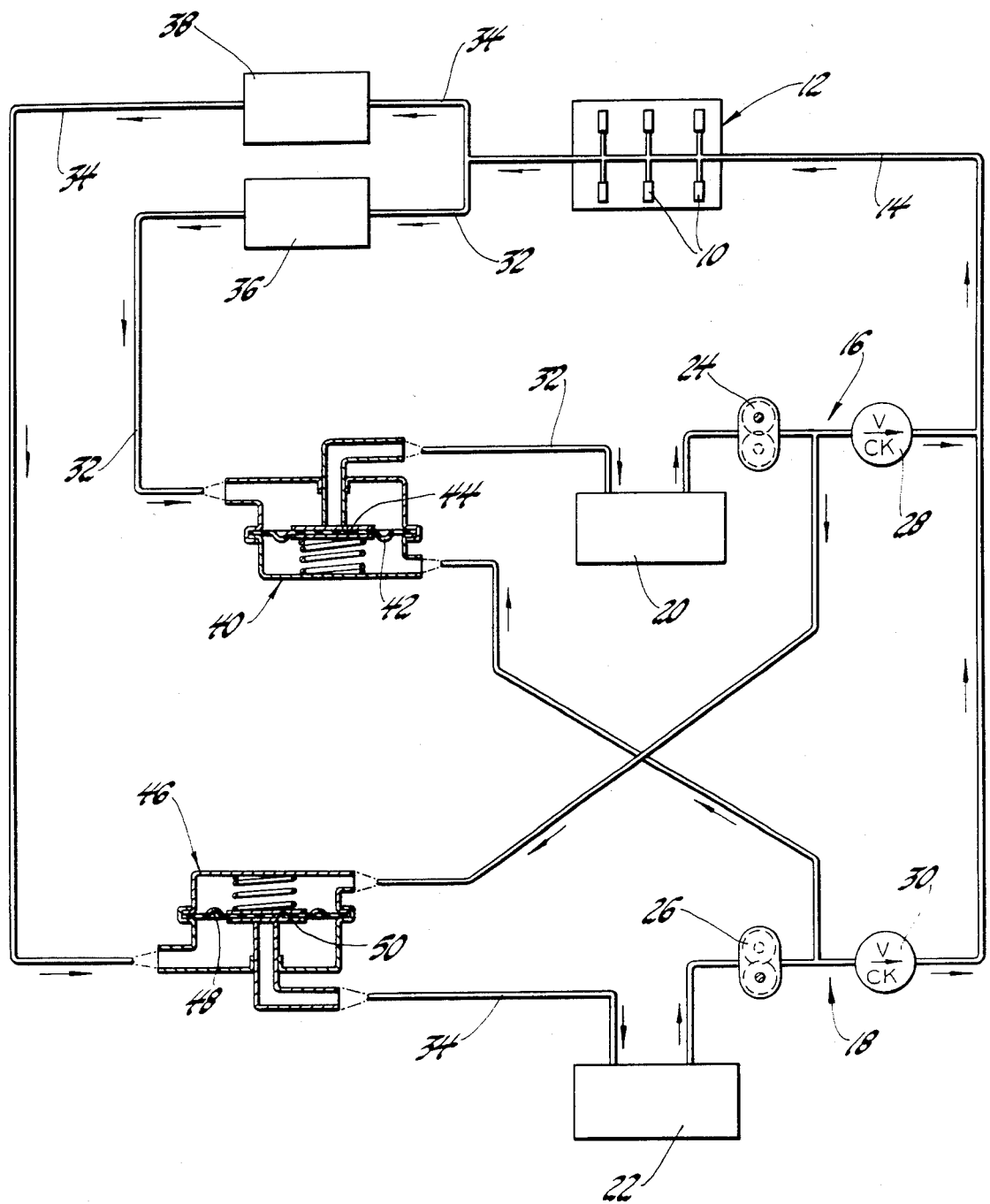

DUAL FUEL SUPPLY SYSTEM

TECHNICAL FIELD

This invention provides a dual fuel supply system for a combustion engine adapted to operate on fuels such as methanol and gasoline.

BACKGROUND

Methanol has the potential to be a readily available, relatively low cost fuel in many locations and can be used to fuel automotive engines. At present, however, methanol is not as readily available as other fuels such as gasoline. A dual fuel supply system allows a vehicle operator to use methanol when it is available and to use another fuel when methanol is not available.

SUMMARY OF THE INVENTION

This invention provides a dual fuel supply system suitable for supplying fuels such as methanol and gasoline to an automotive engine.

In a dual fuel supply system according to this invention, a single fuel supply passage extends to a fuel delivery unit such as one or more fuel injection valves. The fuel supply passage has connections to the sources of fuel such as methanol and gasoline. When it is desired to deliver methanol for combustion in the engine, control apparatus pressurizes the connection of the fuel supply passage to the source of methanol, and when it is desired to supply gasoline to the fuel delivery unit the control apparatus pressurizes the connection of the fuel supply passage to the source of gasoline. As in conventional gasoline fuel injection systems, a fuel return passage extends from the fuel supply passage back to the source of gasoline; in addition a fuel return passage extends from the fuel supply passage back to the source of methanol. The fuel return passages allow fuel to be circulated from either source through the fuel supply passage and back to the source. To inhibit circulation of methanol to the source of gasoline, a valve in the gasoline return passage obstructs fuel flow through the gasoline return passage when the connection between the fuel supply passage and the source of methanol is pressurized. In addition, a similar valve may be employed in the methanol return passage to inhibit circulation of gasoline to the source of methanol when the connection between the fuel supply passage and the source of gasoline is pressurized.

It will be appreciated, of course, that the dual fuel supply system provided by this invention may be employed to supply fuels other than methanol and gasoline.

The details as well as other features and advantages of a preferred embodiment of this invention are set forth in the remainder of the specification and are shown in the accompanying drawing.

SUMMARY OF THE DRAWING

The sole FIGURE of the drawing schematically illustrates a preferred embodiment of the dual fuel supply system provided by this invention.

THE PREFERRED EMBODIMENT

Referring to the drawing, one or more fuel delivery units 10 are controlled by an electronic control unit (not shown) to deliver fuel in a desired manner to an automotive internal combustion engine. While this invention may be used with various kinds of fuel delivery units, it is contemplated that this invention will be employed in a port fuel injection system in which the fuel delivery units 10 are electromagnetic injectors delivering timed pulses of fuel to an engine induction passage at locations downstream of the throttle.

A fuel supply passage 14 extends to fuel delivery units 10 and has connections 16 and 18 to two sources of fuel. Connection 16, in this embodiment, connects fuel supply passage 14 to a gasoline tank 20 while connection 18, in this embodiment, connects fuel supply passage 14 to a methanol tank 22. Control apparatus including a gasoline pump 24 is employed to pressurize connection 16 whenever it is desired to supply gasoline to fuel delivery units 10 while control apparatus including a methanol pump 26 is employed to pressurize connection 18 whenever it is desired to supply methanol to fuel delivery unit 10. A check valve 28 precludes back flow of methanol through connection 16 to gasoline tank 20, and a check valve 30 precludes back flow of gasoline through connection 18 to methanol tank 22.

A gasoline return passage 32 extends from fuel supply passage 14 to gasoline tank 20, and a methanol return passage 34 extends from fuel supply passage 14 to methanol tank 22. Each return passage includes a pressure regulator, with the pressure regulator 36 in gasoline return passage 32 being adapted to maintain a pressure in fuel supply passage 14 of about 38 psi (about 260 kpa), and the pressure regulator 38 in methanol return passage 34 being adapted to maintain a pressure in fuel supply passage 14 of about 60 psi (about 415 kpa). As in normal practice, pressure regulators 36 and 38 are referenced to the pressure in the engine induction passage downstream of the throttle, so that the pressure in fuel supply passage 14 is maintained at a substantially constant difference of either about 38 psi or about 60 psi (about 260 kpa or about 415 kpa) above the induction passage pressure.

Gasoline return passage 32 includes a shut-off valve 40 having a diaphragm 42 subjected on one side to the pressure in gasoline return passage 32 and on the other side to the pressure in connection 18. When connection 18 is pressurized to supply methanol to fuel delivery units 10, the methanol supply pressure forces diaphragm 42 against a valve seat 44 to obstruct fuel flow through gasoline return line 32 to gasoline tank 20. When connection 18 is not pressurized and connection 16 is pressurized to supply gasoline to fuel delivery units 10, the fuel pressure in gasoline return passage 32 displaces diaphragm 42 from valve seat 44 to permit circulation of gasoline from fuel supply passage 14 through gasoline return passage 32 and back to gasoline tank 20.

A similar valve 46 is disposed in methanol return passage 34 and includes a diaphragm 48 subjected on one side to the fuel pressure in methanol return passage 34 and on the other side to the pressure in connection 16. When connection 16 is pressurized to supply gasoline to fuel delivery units 10, the gasoline supply pressure forces diaphragm 48 against a valve seat 50 to obstruct fuel flow through methanol return line 34 to methanol tank 22. When connection 16 is not pressurized and connection 18 is pressurized to supply methanol to fuel delivery units 10, the fuel pressure in methanol return passage 34 displaces diaphragm 48 from valve seat 50 to permit circulation of methanol from fuel supply passage 14 through methanol return passage 34 and back to methanol tank 22. Valves 40 and 46 are thus effective to inhibit circulation of gasoline to methanol tank 22 and to inhibit circulation of methanol to gasoline tank 20.

It will be appreciated that valve 46 may be unnecessary for some applications. Whenever connection 18 is not pressurized and connection 16 is pressurized to supply gasoline to fuel delivery units 10, valve 40 will permit circulation through gasoline return passage 32 to gasoline tank 20 and pressure regulator 36 will maintain a pressure of about 38 psi (about 260 kpa) in fuel supply passage 14. Under those conditions, the approximately 60 psi (about 415 kpa) setting of pressure regulator 38 may preclude circulation of fuel through methanol return passage 34 to methanol tank 22.

It also will be appreciated that, in some applications, a single pressure regulator located at 52 may be substituted for pressure regulators 36 and 38. The single pressure regulator could maintain the same pressure in fuel supply passage 14 for both methanol and gasoline, or it could be controlled to vary the pressure as required in fuel supply passage 14.

The embodiments of the invention in which an exclusive property or privilege is claimed are defined as follows:

1. A combustion engine dual fuel supply system comprising two sources of fuel, a fuel delivery unit, a fuel supply passage extending to said fuel delivery unit and having connections to said sources, control apparatus for at certain times pressurizing the connection of said supply passage to one source to effect fuel flow from said one source through said supply passage to said delivery unit and for at other times pressurizing the connection of said supply passage to the other source to effect fuel flow from said other source through said supply passage to said delivery unit, a first fuel return passage extending from said supply passage back to said one source and a second fuel return passage extending from said supply passage back to said other source whereby fuel may be circulated from either source through said supply passage and back to the source, and a valve in said second return passage responsive to pressurization of the connection of said supply passage to said one source for obstructing fuel flow through said second return passage to inhibit circulation of fuel from said one source through said supply passage to said other source.

2. A combustion engine dual fuel supply system comprising two sources of fuel, a fuel delivery unit, a fuel supply passage extending to said fuel delivery unit and having connections to said sources, control apparatus for at certain times pressurizing the connection of said supply passage to one source to effect fuel flow from said one source through said supply passage to said delivery unit and for at other times pressurizing the connection of said supply passage to the other source to effect fuel flow from said other source through said supply passage to said delivery unit, a first fuel return passage extending from said supply passage back to said one source and a second fuel return passage extending from said supply passage back to said other source whereby fuel may be circulated from either source through said supply passage and back to the source, a valve in said second return passage responsive to pressurization of the connection of said supply passage to said one source for obstructing fuel flow through said second return passage to inhibit circulation of fuel from said one source through said supply passage to said other source, and a valve in said first return passage responsive to pressurization of the connection of said supply passage to said other source for obstructing fuel flow through said first return passage to inhibit circulation of fuel from said other source through said supply passage to said one source.

3. A combustion engine dual fuel supply system comprising two sources of fuel, a fuel delivery unit, a fuel supply passage extending to said fuel delivery unit and having connections to said sources, control apparatus for at certain times pressurizing the connection of said one source to effect fuel flow from said one source through said supply passage to said delivery unit and for at other times pressurizing the connection of said supply passage to the other source to effect fuel flow from said other source through said supply passage to said delivery unit, a first fuel return passage extending from said supply passage back to said one source and a second fuel return passage extending from said supply passage back to said other source whereby fuel may be circulated from either source through said supply passage and back to the source, a pressure regulator in said first return passage for maintaining a first pressure in said supply passage at said certain times, a pressure regulator in said second return passage for maintaining a second pressure in said supply passage at said other times, said first pressure being higher than said second pressure, and a valve in said second return passage responsive to pressurization of the connection of said supply passage to said one source for obstructing fuel flow through said second return passage, whereby fuel circulating from either source through said supply passage cannot return to the opposite source.

4. A combustion engine dual fuel supply system comprising two sources of fuel, a fuel delivery unit, a fuel supply passage extending to said fuel delivery unit and having connections to said sources, control apparatus for at certain times pressurizing the connection of said supply passage to one source to effect fuel flow from said one source through said supply passage to said delivery unit and for at other times pressurizing the connection of said supply passage to the other source to effect fuel flow from said other source through said supply passage to said delivery unit, a first fuel return passage extending from said supply passage back to said one source and a second fuel return passage extending from said supply passage back to said other source whereby fuel may be circulated from either source through said supply passage and back to the source, pressure regulator apparatus controlling flow through said return passages for maintaining a desired pressure in said supply passage, a valve in said second return passage responsive to pressurization of the connection of said supply passage to said one source for obstructing fuel flow through said second return passage to inhibit circulation of fuel from said one source through said supply passage to said other source, and a valve in said first return passage responsive to pressurization of the connection of said supply passage to said other source for obstructing fuel flow through said first return passage to inhibit circulation of fuel from said other source through said supply passage to said one source.

5. A combustion engine dual fuel supply system comprising two sources of fuel, a fuel delivery unit, a fuel supply passage extending to said fuel delivery unit and having connections to said sources, control apparatus for at certain times pressurizing the connection of said one source to effect fuel flow from said one source through said supply passage to said delivery unit and for at other times pressurizing the connection of said supply passage to the other source to effect fuel flow from said other source through said supply passage to said delivery unit, a first fuel return passage extending from said supply passage back to said one source and a second fuel return passage extending from said supply passage back to said other source whereby fuel may be circulated from either source through said supply passage and back to the source, a pressure regulator in said first return passage for maintaining a first pressure in said supply passage at said certain times, a pressure regulator in said second return passage for maintaining a second pressure in said supply passage at said other times, a valve in said second return passage responsive to pressurization of the connection of said supply passage to said one source for obstructing fuel flow through said second return passage to inhibit circulation of fuel from said one source through said supply passage to said other source, and a valve in said first return passage responsive to pressurization of the connection of said supply passage to said other source for obstructing fuel flow through said first return passage to inhibit circulation of fuel from said other source through said supply passage to said one source.

* * * * *